(12) United States Patent
Schilling et al.

(10) Patent No.: US 6,515,981 B1
(45) Date of Patent: *Feb. 4, 2003

(54) PACKET-SWITCHED SPREAD-SPECTRUM SYSTEM

(75) Inventors: Donald L. Schilling, Sands Point, NY (US); Sorin Davidovici, Jackson Heights, NY (US); Emmanuel Kanterakis, North Brunswick, NJ (US); Michael Hennedy, Staten Island, NY (US)

(73) Assignee: Golden Bridge Technology, Inc., West Long Branch, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/466,797

(22) Filed: Dec. 20, 1999

Related U.S. Application Data

(63) Continuation of application No. 08/969,343, filed on Nov. 28, 1997, now Pat. No. 6,061,359, which is a continuation-in-part of application No. 08/692,782, filed on Aug. 2, 1996, now Pat. No. 5,862,133.

(51) Int. Cl.⁷ .............................................. H04B 7/216
(52) U.S. Cl. ........................ 370/342; 370/335; 375/205
(58) Field of Search ................................ 370/342, 441, 370/335; 375/205

(56) References Cited

U.S. PATENT DOCUMENTS

| | | | |
|---|---|---|---|
| 4,504,002 A | 3/1985 | Auchterlonie | ............... 375/209 |
| 4,621,365 A | 11/1986 | Chiu | |
| 5,081,643 A | 1/1992 | Schilling | ......................... 375/1 |
| 5,109,390 A | 4/1992 | Gilhousen et al. | .............. 375/1 |
| 5,177,765 A | 1/1993 | Holland et al. | |
| 5,305,349 A | 4/1994 | Dent | ........................... 370/342 |
| 5,311,544 A | 5/1994 | Park et al. | |
| 5,594,754 A | 1/1997 | Dohi et al. | .................. 375/200 |
| 5,729,570 A | * 3/1998 | Magill | ......................... 370/204 |
| 5,734,648 A | * 3/1998 | Adachi et al. | .............. 370/342 |
| 5,862,133 A | 1/1999 | Schilling | ..................... 370/342 |

FOREIGN PATENT DOCUMENTS

WO 9314588 7/1993

* cited by examiner

*Primary Examiner*—Thanh Cong Le
*Assistant Examiner*—Alan Gantt
(74) *Attorney, Agent, or Firm*—David Newman chartered

(57) ABSTRACT

A system and method for encoding and transmitting data with a spread-spectrum packet-switched system. Data to be transmitted by a packet transmitter are encoded for privacy and to restrict intelligent receipt of the data to the intended recipient. The encoded data is demultiplexed into sub-data-sequence signals which are spread-spectrum processed and then combined as a multichannel spread-spectrum signal. The multichannel spread-spectrum signal is concatenated with a header to output a packet-spread-spectrum signal which is transmitted over radio waves to a packet receiver. The packet receiver obtains timing for the multichannel spread-spectrum signal from the header. The multichannel spread-spectrum signal is then despread and multiplexed as received-encoded data. The received-encoded data is decoded by the intended recipient and stored in a receiver memory for output.

19 Claims, 6 Drawing Sheets

PACKET-SWITCHED SPREAD-SPECTRUM SYSTEM

This is a continuation application of application Ser. No. 08/969,343 filed Nov. 28, 1997, now U.S. Pat. No. 6,061,359, issued, which was a continuation-in-part of Ser. No. 08/692,782, filed Aug. 2, 1996, and issued Jan. 19, 1999 as U.S. Pat. No. 5,862,133.

BACKGROUND OF THE INVENTION

This invention relates to a packet-switched system, as might be used in an ethernet system, and more particularly to using multiple spread-spectrum channels to achieve a high processing gain and maintain a high capacity channel.

DESCRIPTION OF THE RELEVANT ART

For a given bandwidth, processing gain and power level, spread-spectrum communications systems have a limited capacity for communicating information over a single channel. Consider the T1 network and T3 network, by way of example, and assume a spread-spectrum transmitter spread-spectrum processes the message data at a rate of 25 mega-chips per second. For the T1 network which communicates data at up to 1.544 megabits per second, a typical processing gain of 17 might be realized. For the T3 network, which can have data rates of 10 megabits per second, a processing gain of 2.5 might be realized. The low processing gains can result in channel degradation and loss of the advantages of spread-spectrum modulation such as resistance to fading caused by multipath and ability to share the spectrum with other spread-spectrum systems.

SUMMARY OF THE INVENTION

A general object of the invention is a packet-switched system having high processing gain and high capacity.

Another object of the invention is a packet-switched system having sufficient processing gain using orthogonal chip sequences.

An additional object of the invention is a packet-switched system having fast acquisition and synchronization, and low cost.

According to the present invention, as embodied and broadly described herein, a packet-switched system is provided comprising a plurality of packet transmitters that communicate with a plurality of packet receivers using radio waves. Each of the packet transmitters includes a transmitter-first-in-first-out (transmitter-FIFO) memory, an encoder, a demultiplexer, chip-sequence means, a plurality of product devices, a combiner, a header device, and a transmitter subsystem. Each packet receiver includes a translating device, a header-matched filter, a processor, a plurality of data-matched filters, a multiplexer, a decoder, and a receiver-first-in-first-out (receiver-FIFO) memory.

In the packet transmitter, the transmitter-FIFO memory stores data from a data input. The encoder encodes the data from the transmitter-FIFO memory as encoded data. By the term "encoder" for encoding data from the transmitter-FIFO memory is meant privacy type of encoding, such as scrambling or encrypting the data. The term "encoded data" as used herein is meant to include scrambled data or encrypted data. The demultiplexer demultiplexes the encoded data into a plurality of sub-data-sequence signals. A respective sub-data-sequence signal is outputted from a respective output of the demultiplexer. As used herein, the term "sub-data-sequence signal" is a demultiplexed part of the encoded data.

The chip-sequence means outputs a plurality of chip-sequence signals, and the plurality of product devices, or exclusive-OR gates, multiplies each of the sub-data-sequence signals by a respective chip-sequence signal. Each of the chip-sequence signals is orthogonal or has low correlation to the other chip-sequence signals in the plurality of chip-sequence signals. At the output of the plurality of product devices is a plurality of spread-spectrum channels.

The combiner algebraically combines the plurality of spread-spectrum channels as a multichannel-spread-spectrum signal. The header device adds, i.e., concatenates, the multichannel-spread-spectrum signal to a header. The header device outputs a packet-spread-spectrum signal. The header later provides chip-sequence synchronization at the receiver. The transmitter subsystem amplifies and transmits at a carrier frequency the packet-spread-spectrum signal using radio waves over a communications channel.

A packet-spread-spectrum signal, as used herein, is a spread-spectrum signal transmitted by one or more packet transmitters, and arriving at the input of one or more packet receivers. The packet-spread-spectrum signal has the header concatenated with the multichannel-spread-spectrum signal. Timing for the present invention may be triggered from the header as part of the packet-spread-spectrum signal. For the case of the packet-spread-spectrum signal, each packet has the header followed in time by the multichannel-spread-spectrum signal. The header and multichannel-spread-spectrum signal are sent as the packet-spread-spectrum signal, and the timing for the multichannel-spread-spectrum signal, and thus the data, in the packet-spread-spectrum signal is keyed from the header. The data in the multichannel-spread-spectrum signal may contain information such as digitized voice, signaling, adaptive power control (APC), cyclic-redundancy-check (CRC) code, etc.

The header, or preamble, is generated from spread-spectrum processing a header-symbol-sequence signal with a chip-sequence signal. The multichannel-spread-spectrum signal part of the packet-spread-spectrum signal is generated from spread-spectrum processing a plurality of sub-data-sequence signals with the plurality of chip-sequence signals, respectively.

The chip-sequence signal used for the header and data is common to all users. The use of a common chip-sequence signal achieves low cost, since circuitry for changing chip-sequence signals is not required.

At each of the packet receivers, the translating device translates the packet-spread-spectrum signal from the carrier frequency to a processing frequency. The processing frequency may be at a radio frequency (RF), intermediate frequency (IF) or at baseband frequency. The processing frequency is a design choice, and any of the frequency ranges may be used by the invention. The header-matched filter detects the header in the packet-spread-spectrum signal. In response to detecting the header, the header-matched filter outputs a header-detection signal. The processor, in response to the header-detection signal, generates control and timing signals.

The plurality of data-matched filters despreads the multichannel-spread-spectrum signal embedded in the packet-spread-spectrum signal, as a plurality of received spread-spectrum channels. The multiplexer multiplexes the plurality of received spread-spectrum channels as received-encoded data. The decoder decodes the received-encoded data as received data. The receiver-FIFO memory stores the received data and outputs the received data to a data output. In an error-free environment, the received data are identical to the data input to the transmitter.

Another aspect of the present invention includes a packet-switched system comprising a plurality of packet transmitters that communicate with a plurality of packet receivers using radio waves. Each of the packet transmitters includes a transmitter-first-in-first-out (transmitter-FIFO) memory, an encoder, a demultiplexer, chip-sequence means, a first plurality of product devices, a first combiner, a first header device, a second plurality of product devices, a second combiner, a second header device, and a transmitter subsystem. Each packet receiver includes a translating device, a processor, a first plurality of data-matched filters, a second plurality of data-matched filters, a first plurality of header-matched-filter integrators, a second plurality of header-matched-filter integrators, a multiplexer, a decoder, and a receiver-first-in-first-out (receiver-FIFO) memory.

In the packet transmitter, the transmitter-FIFO memory stores data from a data input. The encoder encodes the data from the transmitter-FIFO memory as encoded data. The demultiplexer demultiplexes the encoded data into a first plurality of sub-data-sequence signals and a second plurality of sub-data-sequence signals. A respective sub-data-sequence signal is outputted from a respective output of the demultiplexer.

The chip-sequence means outputs a plurality of chip-sequence signals, and the first plurality of product devices and the second plurality of product devices, or exclusive-OR gates, multiplies each of the first plurality of sub-data-sequence signals and each of the second plurality of sub-data-sequence signals by a respective chip-sequence signal. Each of the chip-sequence signals used to multiply each of the first plurality of sub-data-sequence signals, is orthogonal or has low correlation to the other chip-sequence signals in the plurality of chip-sequence signals. The plurality of chip-sequence signals used with the first plurality of sub-data-sequence signals may be the same and used with the second plurality of sub-data-sequence signals. At the output of the first plurality of product devices is a first plurality of spread-spectrum channels, and at the output of the second plurality of product devices is a second plurality of spread spectrum channels.

The first combiner algebraically combines the first plurality of spread-spectrum channels as a first multichannel-spread-spectrum signal. The first header device adds, i.e., concatenates, the first multichannel-spread-spectrum signal to a first header. The first header device outputs a first packet-spread-spectrum signal. The first header later provides chip-sequence synchronization at the receiver.

The second combiner algebraically combines the second plurality of spread-spectrum channels as a second multichannel-spread-spectrum signal. The second header device adds, i.e., concatenates, the second multichannel-spread-spectrum signal to a second header. The second header device outputs a second packet-spread-spectrum signal. The second header later provides chip-sequence synchronization at the receiver. The transmitter subsystem amplifies and transmits, at a carrier frequency, the first packet-spread-spectrum signal and the second packet-spread-spectrum signal as a quadrature-amplitude modulated (QAM) signal, using spread-spectrum radio waves over a communications channel.

A QAM-spread-spectrum signal, as used herein, is a spread-spectrum signal transmitted by one or more packet transmitters, and arriving at the input of one or more packet receivers. The QAM-spread-spectrum signal has the first header and second header concatenated with the first multichannel-spread-spectrum signal and the second multichannel-spread-spectrum signal, respectively. Timing for the present invention may be triggered from the first and second headers as part of the QAM-spread-spectrum signal. For the case of the QAM-spread-spectrum signal, each packet has the first header followed in time by the first multichannel-spread-spectrum signal, and the second header followed in time by the second multichannel-spread-spectrum signal. The first and second headers and the first and second multichannel-spread-spectrum signals are sent as the QAM-spread-spectrum signal, and the timing for the multichannel-spread-spectrum signal, and thus the data, in the QAM-spread-spectrum signal is keyed from the first and second headers. The data in the first and second multichannel-spread-spectrum signals may contain information such as digitized voice, signalling, adaptive power control (APC), cyclic-redundancy-check (CRC) code, etc.

The first and second headers, or preambles, are generated from spread-spectrum processing a header-symbol-sequence signal with a chip-sequence signal. The first and second multichannel-spread-spectrum signal parts of the QAM-spread-spectrum signal are generated from spread-spectrum processing the first and second plurality of sub-data-sequence signals, respectively, with the plurality of chip-sequence signals.

The chip-sequence signal used for the first and second headers and data is common to all users. The use of a common chip-sequence signal achieves low cost, since circuitry for changing chip-sequence signals is not required.

At each of the packet receivers, the translating device translates the packet-spread-spectrum signal from the carrier frequency to a processing frequency. The processing frequency may be at a radio frequency (RF), intermediate frequency (IF) or at baseband frequency. The processing frequency is a design choice, and any of the frequency ranges may be used by the invention. The header-matched-filter integrator detects the first and second headers in the QAM-spread-spectrum signal. In response to detecting the first and second headers, the header-matched-filter integrator outputs a header-detection signal. The processor, in response to the header-detection signal, generates control and timing signals.

The first and second plurality of data-matched filters despread the first and second multichannel-spread-spectrum signals embedded in the QAM-spread-spectrum signal, as a first and second plurality of received spread-spectrum channels, respectively. The multiplexer multiplexes the first and second plurality of received spread-spectrum channels as received-encoded data. The decoder decodes the received-encoded data as received data. The receiver-FIFO memory stores the received data and outputs the received data to a data output. In an error-free environment, the received data are identical to the data input to the transmitter.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like numerals indicate like elements throughout the several views.

Figure 1:
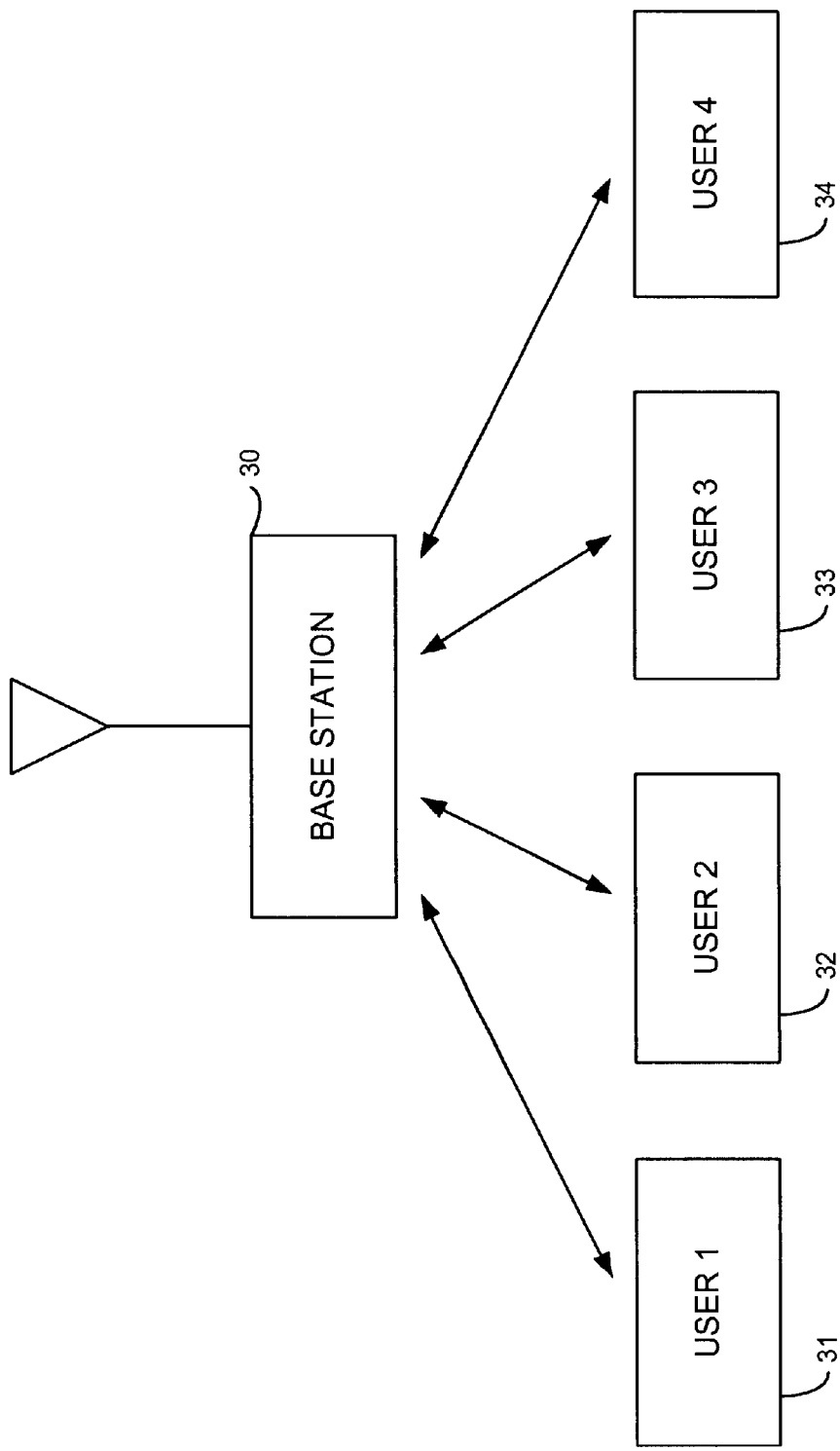
FIG. 1 illustrates a packet-switched system.

The present invention provides a new and novel spread-spectrum, packet-switched system, illustrated in FIG. 1, using a packet-spread-spectrum signal. The packet-switched spread-spectrum system might be used as part of a radio based ethernet system. The packet-switched system includes a base station 30 communicating with a plurality of users 31, 32, 33, 34. The packet-switched system alternatively could be used to communicate between two users, i.e., a peer-to-peer system, or several base stations could be accessed when needed. The base station and each user has a packet transmitter and a packet receiver. The present invention is illustrated, by way of example, with a packet transmitter transmitting the packet-spread-spectrum signal to a packet receiver.

The packet-spread-spectrum signal, in a preferred embodiment, includes a header, followed in time by a multichannel-spread-spectrum signal. The header is concatenated with the multichannel-spread-spectrum signal. The header is generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined, and in a usual practice, is used with a header-symbol-sequence signal. The header, in a preferred embodiment, is a chip-sequence signal used for the purpose of synchronization.

Each spread-spectrum channel of the multichannel-spread-spectrum signal part of the packet-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can be user defined, and preferably is orthogonal to other chip-sequence signals used for generating the plurality of spread-spectrum channels.

Packet-Switched System

The present invention broadly comprises a packet-switched-system for communicating data between a plurality of packet transmitters and a plurality of packet receivers, preferably using radio waves. The terms "packet transmitter" and "packet receiver", as used herein, denote the overall system components for transmitting and receiving, respectively, data.

Each packet transmitter includes transmitter-memory means encoder means, demultiplexer means, transmitter-spread-spectrum means, combiner means, header means, and transmitter-subsystem means. The encoder means is coupled to the transmitter-memory means. The demultiplexer means, which is coupled to the encoder means, has a plurality of outputs. The transmitter-spread-spectrum means is coupled to the plurality of outputs of the demultiplexer means. The combiner means is coupled between the transmitter-spread-spectrum means and the header means.

The transmitter-memory means is coupled to a data input, and stores data from the data input. The encoder means encodes the data from the transmitter-memory means as encoded data. The demultiplexer means demultiplexes the encoded data into a plurality of sub-data-sequence signals, with a respective sub-data-sequence signal at a respective output of the demultiplexer The transmitter-spread-spectrum means spread-spectrum processes each of the sub-data-sequence signals with a respective chip-sequence signal. The output of the transmitter-spread spectrum means is a plurality of spread-spectrum channels, with each spread-spectrum channel corresponding to one of the outputs of the demultiplexer means. The combiner means algebraically combines the plurality of spread-spectrum channels as a multichannel-spread-spectrum signal. The header means concatenates a header to the multichannel-spread-spectrum signal. The header is for chip-sequence synchronization. At the output of the header means is the packet-spread-spectrum signal. The transmitter-subsystem means transmits, at a carrier frequency, the packet-spread-spectrum signal, using radio waves, over a communications channel.

Each of the packet receivers includes translating means, header-detection means, processor means, receiver-spread-spectrum means, multiplexing means, decoding means, and receiver-memory means. The translating means is coupled to the communications channel. The header-detection means is coupled between the translating means and the processor means. The receiver-spread-spectrum means is coupled to the translating means and to the multiplexing means. The decoding means is coupled between the multiplexing means and the receiver-memory means. At the output of the receiver-memory means are the data.

The translating means translates the received packet-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the header embedded in the packet-spread-spectrum signal. The header-detection means outputs, in response to detecting the header, a header-detection signal.

The processor means generates control and timing signals. These signals are used for controlling sequences and timing of the invention.

The receiver-spread-spectrum means despreads the multichannel spread-spectrum signal of the packet-spread-spectrum signal, as a plurality of spread-spectrum signals. The multiplexing means multiplexes the plurality of spread-spectrum signals as the encoded data. The decoding means decodes the encoded data an the receiver memory means stores the data from the decoding means and outputs the data.

Figure 2:
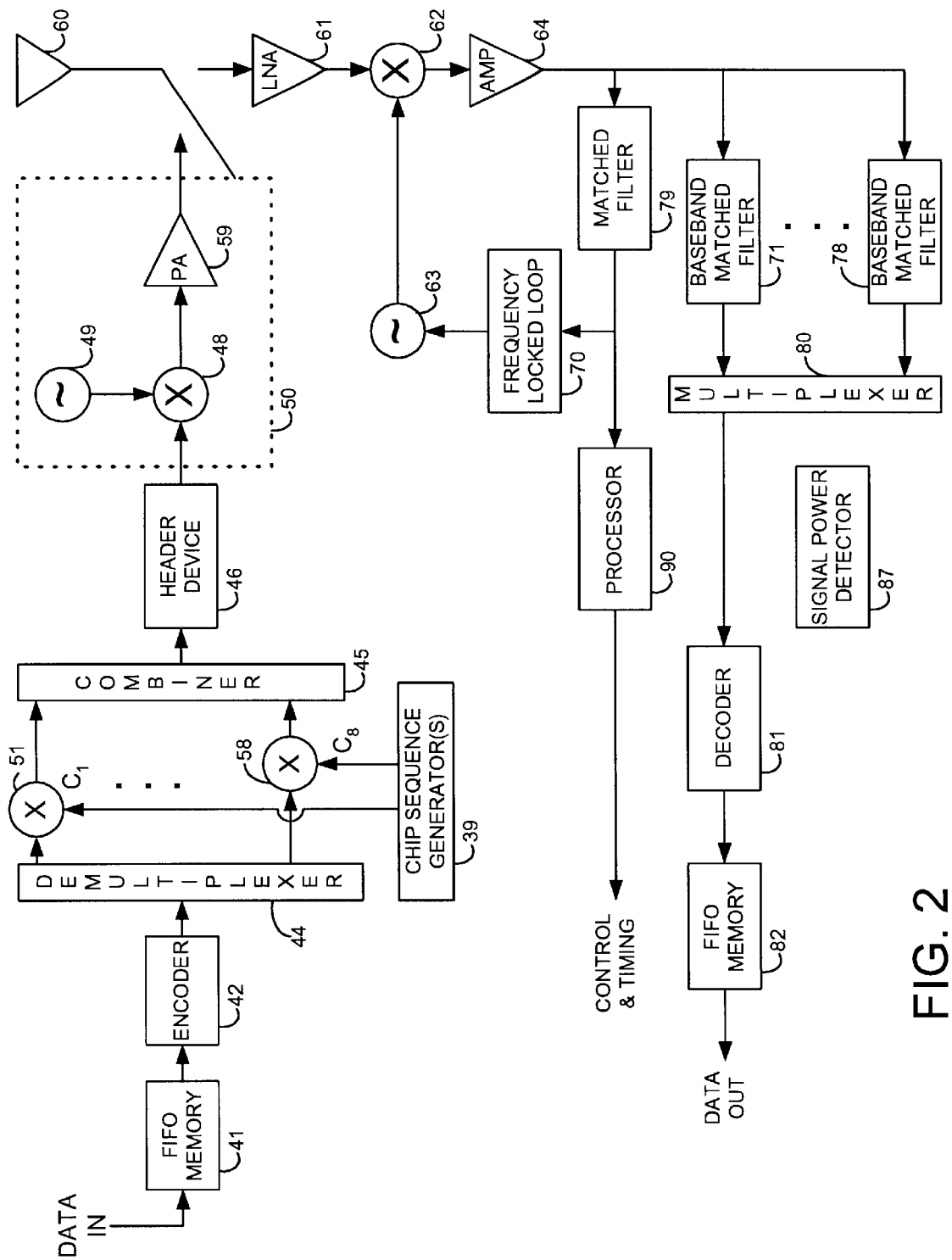
FIG. 2 is a block diagram of a packet transmitter and a packet receiver.

In the exemplary arrangement shown in FIG. 2, the transmitter-memory means is embodied as a transmitterfirst-in-first-out (transmitter-FIFO) memory 41. The transmitter-FIFO memory 41 may employ random access memory (RAM) or other memory components as is well known in the art. The transmitter-FIFO memory 41 may be part of a digital signal processor (DSP); or, preferably, part of an application specific integrated circuit (ASIC).

For the case of an analog signal, an analog-to-digital converter would be inserted before the input to the transmitter-FIFO memory 41 for converting the analog signal to data. The analog-to-digital converter may be a one bit analog-to-digital converter, i.e., a hard limiter.

The encoder means is embodied as an encoder 42. The encoder 42 may be an encryptor or other privacy device. Encoders and privacy devices are well known in the art for encrypting or scrambling data. If security were not a primary concern, privacy may be achieved employing modulo two addition of a bit-sequence signal, generated from a linear shift register. Encryption sequences, generated from a Data Encryption Standard (DES) algorithm, by way of example, may be used when privacy is of high concern.

The encoder 42 encodes the data from the transmitter-FIFO memory 41, as encoded data. The encoding process may include using any of an encryption device, a privacy device, or other device for uniquely distinguishing, as encoded data, a particular data channel. The term encoded data, as used herein, broadly means data that are encrypted or scrambled for privacy.

The demultiplexing means is embodied as a demultiplexer 44. The demultiplexer 44 has a plurality of outputs, with each output having a demultiplexed portion of the encoded signal.

The transmitter-spread-spectrum means is embodied as a chip-sequence means and a plurality of product devices 51, 58. The chip-sequence means may be embodied as a chip-sequence generator 39 for generating a plurality of chip-sequence signals. Alternatively, the transmitter-spread-spectrum means may be embodied as a plurality of EXCLUSIVE-OR gates coupled between the plurality of outputs of the demultiplexer and a memory device for storing the plurality of chip-sequence signals. In this embodiment, the memory device outputs a respective chip-sequence signal to the respective sub-data-sequence signal. A third alternative may include having the transmitter-spread-spectrum means embodied as a memory device, with appropriate detection circuit so that in response to a particular data symbol or data bit at the output of a particular output the demultiplexer, a chip-sequence signal is substituted for the data symbol or data bit. The transmitter-spread-spectrum means may also be embodied as any other technology known in the art capable of outputting a plurality of chip-sequence signals. The combining means is embodied as a combiner 45, the header means is embodied as a header device 46 for concatenating a header with data, and the transmitter-subsystem means is embodied as a transmitter subsystem 50. The transmitter subsystem may include an oscillator 49 and multiplier device 48 for shifting a signal to a carrier frequency, and a power amplifier 59 and/or other circuitry as is well known in the art for transmitting a signal over a communications channel. The signal is transmitted using an antenna 60.

As shown in FIG. 2, the encoder 42 is coupled between the transmitter-FIFO memory 41 and the demultiplexer 44. The chip-sequence generator 39 is coupled to the plurality of product devices 51, 58. The combiner 45 is coupled between the plurality of product devices 51, 58 and the header device 46, and the header device 46 is coupled to the transmitter subsystem 50.

The transmitter-FIFO memory 41 receives data from a data input, and stores the data.

The encoder 42 encodes the data from the transmitter-FIFO 41 as encoded data. The encoder 42 encodes the data using privacy type of encoding, i.e., scrambling the data or encrypting the data. Thus, the encoded data are scrambled data or encrypted data. The encoder 42 is necessary for distinguishing data from different users. By having the proper key for decoding the encoded data, data from a particular user are distinguished from data from other uses. Thus, the encoding of the data is what defines a user's channel, unlike other multichannel spread-spectrum systems, where a user's channel is defined by a particular chip-sequence signal. By encoding the data with encoder 42, a common set of chip-sequence signals can be used by all users, reducing cost of having matched filters or correlators. The reduced cost is achieved since, at a receiver, one set of matched filters or correlator is required for the despreading the multichannel-spread-spectrum signal from all users, and different sets of matched-filters or correlators are not required for each user.

The demultiplexer 44 demultiplexes the encoded data into a plurality of sub-data-sequence signals, with a respective sub-data-sequence signal at a respective output of the demultiplexer 44. The demultiplexer 44 may be embodied as a serial-to-parallel converter.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The plurality of product devices 51, 58, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequence signal from the demultiplexer, by a respective chip-sequence signal from the chip-sequence generator 39.

The plurality of product devices 51, 58 multiplies each of the sub-data-sequence signals by a respective chip-sequence signal. At the output of the plurality of product devices 51, 58 is a plurality of spread-spectrum channels, respectively. A particular spread-spectrum channel is identified by the chip-sequence signal that was used to spread-spectrum process the particular sub-data sequence signal.

The combiner 45 algebraically combines the plurality of spread-spectrum channels, and outputs the combined signal as a multichannel-spread-spectrum signal. Preferably, the combiner 45 combines the plurality of spread-spectrum channels linearly, although some nonlinear process may be involved without significant degradation in system performance.

The header device 46 concatenates a header to the multichannel-spread-spectrum signal. At the output of the header device 46 is the packet-spread-spectrum signal. The header is for chip-sequence synchronization at the receiver.

The transmitter subsystem 50 transmits, at a carrier frequency, the packet-spread-spectrum signal using radio waves over a communications channel. The transmitter subsystem 50 of the packet transmitter includes appropriate filters, power amplifiers and matching circuits coupled to an antenna 60. The transmitter subsystem 50 also may include a hard limiter, for hard limiting the packet-spread-spectrum signal before transmitting.

At the receiver, as shown in FIG. 2, the translating means is shown as a translating device 62 with oscillator 63 and frequency locked loop 70. The translating device 62 is coupled through an antenna 61 to the communications channel and through an amplifier 64 to the header-matched filter 79. The translating device 62 is coupled to oscillator 63, and the oscillator 63 is coupled to frequency locked loop 70. The header-matched filter 79 is coupled to frequency locked loop 70. The processor 90 is coupled to the header-matched filter 79. The plurality of data-matched filters 71, 78 is coupled between the translating device 62 and the multiplexer 80. The decoder 81 is coupled between the multiplexer 80 and the receiver-FIFO memory 82.

The translating device 62 translates the received packet-spread-spectrum signal from the carrier frequency to a processing frequency. The translating device 62 may be a mixer which is well known in the art, for shifting an information signal, which in this disclosure is the received packet-spread-spectrum signal, modulated at a carrier frequency to IF or baseband. The processing frequency may be RF, IF, at baseband frequency or other desired frequency for a digital signal processor. The signal for shifting the received packet-spread-spectrum signal is produced by oscillator 63.

The header-detection means is embodied as a header-matched filter 79. The header-matched filter 79 detects, at the processing frequency, the header embedded in the packet-spread-spectrum signal. The term "header-matched filter" as used herein, is a matched filter for detecting the header, by having an impulse response matched to the chip-sequence signal of the header of the packet-spread-spectrum signal. The header-matched filter may be a digital-matched filter, a surface-acoustic-wave (SAW) device, software operating in a processor or part of an application specific integrated circuit (ASIC). In response to detecting the header, the header-matched filter 79 outputs a header-detection signal. The header-matched filter at a base station can detect the header embedded in the packet-spread-spectrum signal from all users, since the chip-sequence signal for the header and data is common to all users.

The header-detection means alternatively may be embodied as a frame-matched filter, coupled to an output of a data-matched filter or to the output of the multiplexer 80. This alternative is taught in U.S. Pat. No. 5,627,855, entitled PROGRAMMABLE TWO-PART MATCHED FILTER FOR SPREAD SPECTRUM by Davidovici, which is incorporated herein by reference.

The frequency locked loop 70 is frequency locked in response to the header-detection signal. The frequency locked loop 70 locks the frequency of the oscillator 63 to the carrier frequency of the received packet-spread-spectrum signal. Circuits for frequency locked loops, and their operation, are well known in the art.

The processor means is embodied as a processor 90. The processor 90, in response to the header-detection signal, generates control and timing signals. The control and timing signals are used for controlling sequences and timing of the invention.

The receiver-spread-spectrum means is embodied as a plurality of data-matched filters 71, 78. Each of the plurality of data-matched filters 71, 78 has an impulse response matched to a chip-sequence signal of a respective one of the plurality of chip-sequence signals. The data-matched filters may be embodied as a digital-matched filter, SAW device, software operating in a processor, or an ASIC. The plurality of data-matched filters 71, 78 despreads the multichannel-spread-spectrum signal of the packet-spread-spectrum signal as the plurality of received spread-spectrum channels.

Each chip-sequence signal in the plurality of chip-sequences signals is different, one from another. The plurality of chip-sequence signals, however, is common to all users. Thus, the plurality of data-matched filters 71, 78 can detect the plurality of chip-sequence signals from any of the users.

The multiplexing means is embodied as a multiplexer 80 and the decoding means is embodied as a decoder 81. The multiplexer 80 multiplexes the plurality of received spread-spectrum channels as the received-encoded data. The received-encoded data, in an error-free environment, is the same as the encoded data that was generated at the packet transmitter.

The decoder 81 decodes the received-encoded data as the received data. The decoding is what distinguishes one user from another, since each user encodes with a different privacy type of encoding. For example, a first user and a second user may encode first data and second data, respectively, using a first key and a second key for the DES. Alternatively, the first user and the second user might encode first data and second data, respectively, using modulo two addition of bits from linear shift register. In the linear register example, the first user would have a first set of taps or settings for generating a first bit sequence, and the second user would have a second set of taps or settings for generating a second bit sequence. The second bit sequence would therefore be different from the first of sequence.

If the decoder 81 were set to decode with the first key, then either the first data would appear at the output of decoder 31, or non-decoded data would appear at the output of decoder 31. The presence of non-decoded data would be rejected by the decoder 81.

The receiver-memory means is embodied as a receiver-first-in-first-out (receiver-FIFO) memory 82. The presence of first data, which would be detected by the presence of a correct data sequence in the header or data portion of the packet, would pass to the receiver-FIFO memory 82. A correct data sequence might be a particular combination of bits, indicating proper decoding. The receiver-FIFO memory 82 stores the received data and has the data present at an output.

The present invention also comprises a method. The method includes the steps of storing data in a memory and encoding the data from the memory as encoded data. The data are demultiplexed using a demultiplexer, into sub-data sequence signals. The method includes generating a plurality of chip-sequence signals, and multiplying each of the sub-data-sequence signals by a respective chip-sequence signal, thereby generating a plurality of spread-spectrum channels.

The steps include algebraically combining the plurality of spread-spectrum channels as a multichannel-spread-spectrum signal, concatenating a header to the multichannel-spread-spectrum signal to generate a packet-spread-spectrum signal, and transmitting on a carrier frequency the packet-spread spectrum signal over a communications channel using radio waves.

The steps include, at a packet receiver, translating the packet-spread-spectrum signal from the carrier frequency to a processing frequency, and detecting, at the processing frequency, the header embedded in the packet-spread-spectrum signal. The chip-sequence signal used for the header and the data is common to all uses. In response to detecting the header, the method includes outputting a header-detection signal and generating control and timing signals. The steps also include despreading the multichannel-spread-spectrum signal of the packet-spread-spectrum signal as a plurality of received spread-spectrum channels. The plurality of received spread-spectrum channels are multiplexed as received-encoded data. The steps include decoding the received-encoded data as received data, and storing the received data in a memory for output to a data output.

The packet-switched system is a wideband code division multiple access (W-CDMA) system, capable of transmitting, in a particular application, 9.6 megabits per second of data. For example, the following discussion assumes operation in the frequency band 2.4–2.483 GHz, although operation in other bands is possible. Preferred bandwidths are 26 MHz, available in Japan, and 70 MHz, for operation in USA, but again other bandwidths are possible.

In order to achieve a high processing gain at these bandwidths the data are demultiplexed. In FIG. 2, 19.2 megachips per second and a demultiplex factor of eight is employed for 26 MHz bandwidth operation.

The circuit operation of FIG. 2 is as follows:
1. The data are entered mechanically or electrically into a transmitter-FIFO memory 41 and read out at a 9.6 megabits per second rate.
2. The data are encoded by encoder 42 and, in the example shown here, a linear pseudo-noise (PN) generator generates a PN-bit-sequence signal. Such techniques for generating a PN bit sequence are well known in the art. A 127 length section of the $2^{16}-1=64,000$ length pseudo-noise sequence is used. Each user has a different PN-bit sequence. There are 64,000 different, 127 length PN-bit sequences possible in the system illustrated. The encoded data are demultiplexed into eight, 9.6/8=1.2 megabits per second sub-data-sequence signals.
3. Each bit is spread using a 16 chip/bit code. The chip-sequence signals $C_i$–$C_s$ are each orthogonal to one another, i.e., $C_i \cdot C_j = 0$, $i \neq j$.

Obtaining orthogonal chip-sequence signals is well known. In a preferred embodiment, the standard procedure of taking a chip-sequence signal of length 15 is used and called g(i); the chip-sequence signal is shifted by n=1, 2, . . . , 15 to yield the code words g(i−n) n=1, . . . , 15. Each codeword is of length 15. Each chip-sequence signal is then increased by one chip by adding a zero chip as the last chip. Thus {{g(i−n)}, 0} contains 16 chips and chip-sequence signals for different n are orthogonal.
4. The sub-data sequence signals, i.e., the multichannel-spread-spectrum signal, are concatenated with a header by a header device 46. In this example the header is a chip-sequence signal, 3,360 chips long.
5. Each user has the same header and the same set of spreading chip-sequence signals.
6. The number of chips/bit can be any number e.g., 4, 8, 16, 32. The key is that different chip-sequence signals, $C_i \cdot C_j$, are orthogonal. This enhances processing gain (PG) for increased interference immunity.

In other systems, only one user can transmit at a time and, if two users transmit simultaneously, a collision will occur and packet signals from both users will not be received correctly. In the packet-switched system of the present invention, two packet-spread-spectrum signals can be received simultaneously; a third may cause errors.

Clearly, two or three or more simultaneous transmissions depend only on the processing gain which is a design parameter and not fundamental to the present invention.
7. The spread data is unconverted and amplified by transmitter subsystem 50 and transmitted. A typical link analysis is included as Table 1.

The received signal is amplified in a low noise amplifier 61 (LNA) and down-converted, by mixer 62 with a signal from a local oscillator 63, to baseband. The signal is then amplified by amplifier 64 and hard limited by a hard limiter. The amplifier 64 may include the hard limiter.
8. The received signal is detected by the header-matched filter 79 and then by the plurality of data-matched filters 71, 78. The output of the header-matched filter 79 goes to the frequency locked loop (FLL) 70 to control the frequency. The frequency locked loop 70 design is standard as is known in the art. Analog designs also are possible.
9. The despread data are then multiplexed by multiplexer 80 and decoded by decoder 81.
10. Forward error correction (FEC) is not shown but can be employed.
11. The data can be stored in a receiver-FIFO memory 82 before outputting.
12. To minimize collisions, each receiver can read the matched filter output power using a signal power detector 87. When the power is low the user can transmit. When the power level is high, transmission is stopped.
13. The processor 90 handles all control and timing functions.
14. Matched filter acquisition and tracking are not shown for simplicity since techniques for these functions are well known in the art.

TABLE 1

Link Budget (Frequency = 2.4 Ghz; Bandwidth 70 MHz)

| Parameter | Units | Forward Link | Reverse Link |
|---|---|---|---|
| a. Transmit Power | dBm | 20 | 20 |
| b. Transmit Antenna Gain | dB | 0 | 0 |
| c. Receive Antenna Gain | dB | 0 | 0 |
| d. EIRP | dBm | 20 | 20 |
| e. Range | km | 0.4 | 0.4 |
| f. Range Loss | dB | −88 | −88 |
| g. Receive Signal Power | dBm | −68 | −68 |
| h. Noise Figure | dB | 6 | 6 |
| i. Noise Power Density | dBm/Hz | −174 | −174 |
| j. Noise Power in 70 MHz | dBm | −90 | −90 |
| k. Processing Gain | dB | 12 | 12 |
| l. Received $E_b/N_o$ | dB | 34 | 34 |
| m. Required $E_b/N_o$ | dB | 13 | 13 |
| n. Margin for shadowing | dB | 21 | 21 |

TABLE 2

10 Mb/s Packet Switching Specifications

| Equipment | Base | Terminal |
|---|---|---|
| Operating Band | 2400–2480 MHz | 2400–2480 MHz |
| Bandwidth | 70 MHz | 70 MHz |
| RF Bandwidth | 70 MHz | 70 MHz |
| Duplex Method | packet switched | packet switched |
| Multiple Access Technique | GBT-CDMA | GBT-CDMA |
| Number of Transmitter Chip-Sequences | $2^{31}$-1 | $2^{31}$-1 |
| TX data Rate: Traffic Signalling/APC | 9.6 Mb/s | 9.6 Mb/s |
| Control Frame Length | variable | variable |
| Data Modulation | BPSK | BPSK |
| Spreading Technique | Direct Sequence | Direct Sequence |
| Sequence Length | | |
| Header | 48 chips | 48 chips |
| Data | 16 chips | 16 chips |
| Chip Rate | 38.4 Mchips/s | 38.4 Mchips/s |
| Processing Gain | 12 dB | 12 dB |
| Transmitter power | 100 mW | 100 mW |

TABLE 2-continued

10 Mb/s Packet Switching Specifications

| Equipment | Base | Terminal |
|---|---|---|
| (max) | | |
| Service Range (free | 0.4 km | 0.4 km |
| Number of Antenna Sectors | omni | omni |
| Capacity | | 2 simultaneous users |

TABLE 3

Link Budget (Frequency = 2.4 Ghz; Bandwidth = 26 MHz)

| Parameter | Units | Forward Link | Reverse Link |
|---|---|---|---|
| a. Transmit Power | dBm | 20 | 20 |
| b. Transmit Antenna Gain | dB | 0 | 0 |
| c. Receive Antenna Gain | dB | 0 | 0 |
| d. EIRP | dBm | 20 | 20 |
| e. Range | km | 0.8 | 0.8 |
| f. Range Loss | dB | −100 | −100 |
| g. Receive Signal Power | dBm | −80 | −80 |
| h. Noise Figure | dB | 6 | 6 |
| i. Noise Power Density | dBm/Hz | −174 | −174 |
| j. Noise Power in 26 MHz | dBm | −94 | −94 |
| k. Processing Gain | dB | 12 | 12 |
| l. Received $E_b/N_o$ | dB | 26 | 26 |
| m. Required $E_b/N_o$ | dB | 13 | 13 |
| n. Margin for shadowing | dB | 13 | 13 |

TABLE 4

10 Mb/s Packet Switching Specification

| Equipment | Base | Terminal |
|---|---|---|
| Operating Band | 2400–2480 MHz | 2400–2480 MHz |
| RF Bandwidth | 26 MHz | 26 MHz |
| Duplex Method | Time Division Duplex | Time Division Duplex |
| Multiple Access Technique | GBT-CDMA | GBT-CDMA |
| Number of Transmitter Chip-Sequences | | $2^{31}-1$ |
| TX Data Rate: Traffic Signalling/APC | 384, 144, 128, 64, 32 Kb/s | 384, 144, 128, 68, 32 Kb/s |
| Forward Error Coding | Rate-1/2 Constraint Length-7 Convolutional Code | Rate-1/2 Constraint Length-7 Convolutional Code |
| Interleaver | 5 ms | 5 ms |
| Control Frame Length | 500 usec | 500 usec |
| Data Modulation | BPSK | BPSK |
| Spreading Technique | Direct Sequence | Direct Sequence |
| Sequence Length | 6,930,000 chips | 6,930,000 chips |
| Chip Rate | 38.4 Mchips/s | 38.4 Mchips/s |
| Processing Gain | 13 dB | 12 dB |
| Transmitter power (max) | 100 mW | 100 mW |
| Service Range (free space) | 0.8 km | 0.8 km |
| Number of Antenna | omni | omni |
| Capcacity | | 2 simultaneous users |

QAM Packet-Switched System

The present invention also provides a new and novel spread-spectrum, packet-switched system, using a quadrature-amplitude-modulated (QAM) spread-spectrum signal. The QAM-spread-spectrum signal, in a preferred embodiment, includes a first header, followed in time by a first multichannel-spread-spectrum signal, and a second header, followed in time by a second multichannel-spread-spectrum signal. The first and second headers are concatenated with the first and second multichannel-spread-spectrum signals, respectively. The first and second headers are generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user-defined, and in a usual practice, is used with a header-symbol-sequence signal. The header, in a preferred embodiment, is a chip-sequence signal used for the purpose of synchronization.

Each spread-spectrum channel of the first and second multichannel-spread-spectrum signals part of the QAM-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can be user-defined, and preferably is orthogonal to other chip-sequence signals used for generating the plurality of spread-spectrum channels.

In the QAM packet-switched system, each packet transmitter includes transmitter-memory means, encoder means, demultiplexer means, transmitter-spread-spectrum means, combiner means, header means, and transmitter-subsystem means. The encoder means is coupled to the transmitter-memory means. The demultiplexer means, which is coupled to the encoder means, has a plurality of outputs. The transmitter-spread-spectrum means is coupled to the plurality of outputs of the demultiplexer means. The combiner means is coupled between the transmitter-spread-spectrum means and the header means.

The transmitter-memory means is coupled to a data input, and stores data from the data input. The encoder means encodes the data from the transmitter-memory means as encoded data. The demultiplexer means demultiplexes the encoded data into a first plurality of sub-data-sequence signals and a second plurality of sub-data-sequence signals, with a respective sub-data-sequence signal at a respective output of the demultiplexer means.

The transmitter-spread-spectrum means spread-spectrum processes each of the first plurality of sub-data-sequence signals, and each of the second plurality of sub-data-sequence signals, with a respective chip-sequence signal. The output of the transmitter-spread-spectrum means is a first plurality of spread-spectrum channels and a second plurality of spread-spectrum channels, with each spread-spectrum channel corresponding to one of the outputs of the demultiplexer means. The combiner means algebraically combines the first plurality of spread-spectrum channels as a first multichannel-spread-spectrum signal, and the second plurality of spread-spectrum channels as a second multichannel spread-spectrum signal. The header means concatenates a first header to the first multichannel-spread-spectrum signal, and a second header to the second multichannel-spread-spectrum signal. The first header and the second header are for chip-sequence synchronization. At the output of the header means is a first packet-spread-spectrum signal and a second packet-spread-spectrum signal. The transmitter-subsystem means transmits, at a carrier frequency, the QAM-spread-spectrum signal, using radio waves, over a communications channel.

Each of the packet receivers includes translating means, header-detection means, processor means, receiver-spread-spectrum means, multiplexing means, decoding means, and receiver-memory means. The translating means is coupled to the communications channel. The header-detection means is coupled between the receiver-spread-spectrum means and the processor means. The receiver-spread-spectrum means is coupled to the translating means and to the multiplexing means. The decoding means is coupled between the multiplexing means and the receiver-memory means. At the output of the receiver-memory means are the data.

The translating means translates the received QAM-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the first header and the second header embedded in the QAM-spread-spectrum signal. The header-detection means outputs, in response to detecting the first header and the second header, a header-detection signal.

The processor means generates control and timing signals. These signals are used for controlling sequences and timing of the invention.

The receiver-spread-spectrum means despreads the first multichannel spread-spectrum signal and the second multichannel spread-spectrum signal embedded in the QAM-spread-spectrum signal, as a first plurality of spread-spectrum signals and a second plurality of spread-spectrum signals. The multiplexing means multiplexes the first plurality of spread-spectrum signals and the second plurality of spread-spectrum signals as the encoded data. The decoding means decodes the encoded data and the receiver memory means stores the data from the decoding means and outputs the data.

Figure 3:
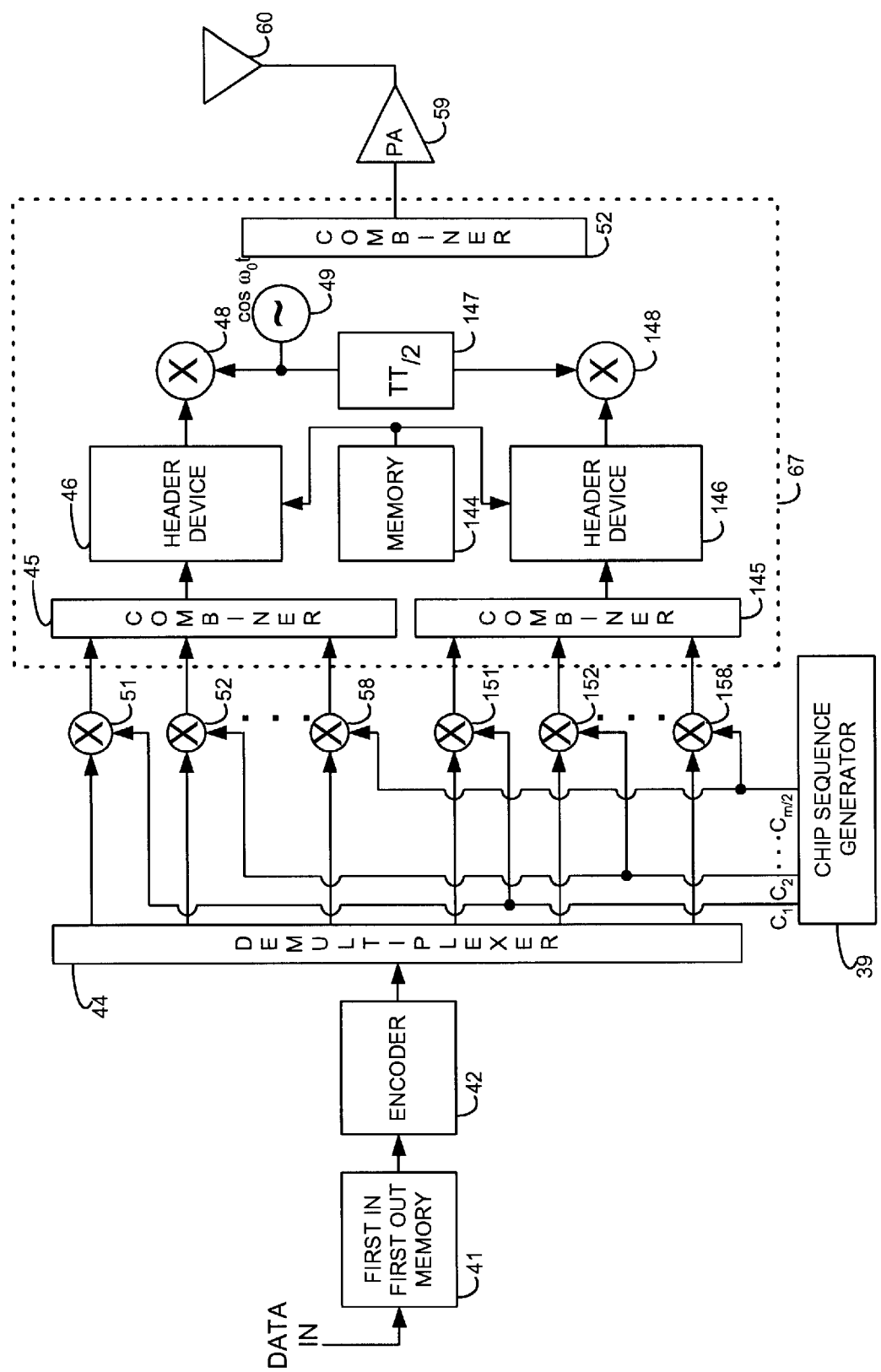
FIG. 3 is a block diagram of a packet transmitter.

In the exemplary arrangement shown in FIG. 3, the transmitter-memory means is embodied as a transmitter-first-in-first-out (transmitter-FIFO) memory 41. The transmitter-FIFO memory 41 may employ random access memory (RAM) or other memory components as is well known in the art. The transmitter-FIFO memory 41 may be part of a digital signal processor (DSP); or, part of an application specific integrated circuit (ASIC).

For the case of an analog signal, an analog-to-digital converter would be inserted before the input to the transmitter- FIFO memory 41 for converting the analog signal to data. The analog-to-digital converter may convert an analog signal to one or a multilevel value, or may be a one bit analog-to-digital converter, i.e., a hard limiter.

The encoder means is embodied as an encoder 42. The encoder 42 may be an encryptor or other privacy device. Encoders and privacy devices are well known in the art for encrypting or scrambling data. If security were not a primary concern, privacy may be achieved employing modulo two addition of a bit-sequence signal, generated from a linear shift register. Encryption sequences, generated from a Data Encryption Standard (DES) algorithm, by way of example, may be used when privacy is of high concern.

The encoder 42 encodes the data from the transmitter-FIFO memory 41, as encoded data. The encoding process may include using any of an encryption device, a privacy device, or other device for uniquely distinguishing, as encoded data, a particular data channel. The term "encoded data," as used herein, broadly means data that are encrypted or scrambled for privacy. Privacy is not the necessary use of the encoded data, however. The encoded data serve to distinguish a first QAM-spread-spectrum signal from a second QAM-spread-spectrum signal.

The demultiplexing means is embodied as a demultiplexer 44. The demultiplexeer 44 may be embodied as a serial-to-parallel converter. The outputs of the demultiplexer 44 are divided into a first plurality of outputs and a second plurality of outputs. Each output of the demultiplexer 44 has a demultiplexed portion of the encoded signal.

The transmitter-spread-spectrum means is embodied as a chip-sequence means and a first plurality of product devices 51, 52, 58 and a second plurality of product devices 151, 152, 158. The chip-sequence means may be embodied as a chip-sequence generator 39 for generating a plurality of chip-sequence signals.

Alternatively, the transmitter-spread-spectrum means may be embodied as a plurality of EXCLUSIVE-OR gates, coupled between the plurality of outputs of the demultiplexer 44, and a memory device for storing the plurality of chip-sequence signals. In this embodiment, the memory device outputs a respective chip-sequence signal in response to the respective sub-data-sequence signal.

A third alternative may include having the transmitter-spread-spectrum means embodied as a memory device, with an appropriate detection circuit, so that in response to a particular data symbol or data bit at the output of a particular output of the demultiplexer, a chip-sequence signal is substituted for that data symbol or data bit. The transmitter-spread-spectrum means may also be embodied as other technology known in the art capable of outputting a plurality of chip-sequence signals.

The combining means is embodied as a first combiner 45 and a second combiner 145, the header means is embodied as a first header device 46 for concatenating a first header with data and a second header device 146 for concatenating a second header with data, and the transmitter-subsystem means is embodied as a transmitter subsystem. A memory 144 may store the header used by first header device 46 and second header device 146. A memory for storing the header may be included as part of the first header device 46 and the second header device 146. Alternatively, a shift register with appropriate taps may generate the header, as is well known in the art.

The transmitter subsystem may include an oscillator 49 and in-phase multiplier device 48 for shifting a first multichannel-spread-spectrum signal to a carrier frequency, a quadrature-phase multiplier device 148 coupled through a 90° phase shift device 147 to the oscillator 49 for shifting a second multichannel-spread-spectrum signal to a carrier frequency, a combiner 52 and a power amplifier 59 and/or other circuitry as is well known in the art for transmitting a signal over a communications channel. The QAM-spread-spectrum signal is transmitted using an antenna 60. The QAM modulator 67 comprises the elements within the dashed lines.

As shown in FIG. 3, the encoder 42 is coupled between the transmitter-FIFO memory 41 and the demultiplexer 44. The chip-sequence generator 39 is coupled to the first plurality of product devices 51, 52, 58, and to the second plurality of product devices 151, 152, 158. The first combiner 45 is coupled between the first plurality of product devices 51, 52, 58 and the first header device 46, and the first header device 46 is coupled to the in-phase multiplier device 48. The second combiner 145 is coupled between the second plurality of product devices 151, 152, 158 and the second header device 146, and the second header device 146 is coupled to the quadrature-phase multiplier device 148.

The transmitter-FIFO memory 41 receives data from a data input, the stores the data. The first data stored in the transmitter-FIFO memory 41 are the first data outputted from the transmitter-FIFO memory 41.

The encoder 42 encodes the data from the transmitter-FIFO 41 as encoded data. The encoder 42 encodes the data using privacy type of encoding, i.e., scrambling the data or encrypting the data. Thus, the encoded data are scrambled data or encrypted data.

The encoder 42 is necessary for distinguishing data from different users. By having the proper key for decoding the encoded data, data from a particular user are distinguished from data from other users. Thus, the encoding of the data is what defines a user's channel, unlike other multichannel spread-spectrum systems, where a user's channel is defined by a particular chip-sequence signal. By encoding the data with encoder 42, a common set of chip-sequence signals can be used by all users, reducing the cost of having matched filters or correlators. The reduced cost is achieved since, at a receiver, different sets of matched-filters or correlators are not required for each user but instead one set of matched filters or correlators is required for despreading the multichannel-spread-spectrum signal from all users.

The demultiplexer 44 demultiplexes the encoded data into a first plurality of sub-sequence signals and a second plurality of sub-data-sequence signals, with a respective sub-data-sequence signal at a respective output of the demultiplexer 44. Typically, the first plurality of sub-data-sequence signals are half of the data-sequence signals outputted from the demultiplexer 44, and the second plurality of sub-data-sequence signals are the other half of the data-sequence signals outputted from the demultiplexer 44.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The chip sequences used for data spreading are not necessarily pseudonoise sequences. The chip sequences may be derived from the Barker sequences of length 11; each Barker sequence is a shift of the original Barker sequence of length 11. In order to make the Barker sequence set orthogonal, each shift of the original BARKER code of length 11 is augmented with a 1.

In a preferred embodiment, the chip-sequence generator 39 generates a particular chip-sequence signal from Barker sequences in combination with a pseudorandom cover sequence. Thus, Barker sequences are multiplied by the same pseudorandom sequence. The use of Barker sequences with pseudorandom sequences gives protection against multipath as well as better cross-correlation properties.

TABLE 5

| 1 | 1  | 1  | 1  | -1 | -1 | -1 | 1  | -1 | -1 | 1  | -1 |
|---|----|----|----|----|----|----|----|----|----|----|----|
| 1 | -1 | 1  | 1  | 1  | -1 | -1 | -1 | 1  | -1 | -1 | 1  |
| 1 | 1  | -1 | 1  | 1  | 1  | -1 | -1 | -1 | 1  | -1 | -1 |
| 1 | -1 | 1  | -1 | 1  | 1  | 1  | -1 | -1 | -1 | 1  | -1 |
| 1 | -1 | -1 | 1  | -1 | 1  | 1  | 1  | -1 | -1 | -1 | 1  |
| 1 | 1  | -1 | -1 | 1  | -1 | 1  | 1  | 1  | -1 | -1 | -1 |
| 1 | -1 | 1  | -1 | -1 | 1  | -1 | 1  | 1  | 1  | -1 | -1 |
| 1 | -1 | -1 | 1  | -1 | -1 | 1  | -1 | 1  | 1  | 1  | -1 |
| 1 | -1 | -1 | -1 | 1  | -1 | -1 | 1  | -1 | 1  | 1  | 1  |
| 1 | 1  | -1 | -1 | -1 | 1  | -1 | -1 | 1  | -1 | 1  | 1  |
| 1 | 1  | 1  | -1 | -1 | -1 | 1  | -1 | -1 | 1  | -1 | 1  |

The matrix of Table 5 illustrates the Barker sequences set. Each row is a Barker sequences derived from the row above by a rotation. The rotation affects only the second through the twelfth element. The first element stays the same and is a "1"; this is the augmentation symbol that makes the Barker sequences orthogonal.

The system operates in two modes. The first mode is compatible with the IEEE 802.11 standard and it uses only one sequence: the original Baker code of length 11. In this mode the data rates sustained are 1 and 2 Mbps. In the second mode, the data rates sustained go to a maximum of 20.17 Mbps. In this embodiment, the maximum data rate is 4.83 Mbps. The high data rate is obtained without bandwidth expansion. Both modes use the same clock (chip) rate, which is an advantage in the implementation of the chip.

In FIG. 3, the first plurality of product devices 51, 52, 58, and the second plurality of product devices 151, 152, 158, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequences signal from the demultiplexer, by a respective chip-sequence signal from the chip-sequence generator 39.

The first plurality of product devices 51, 52, 58 multiple each of the first plurality of sub-data-sequence signals by a respective chip-sequence signal from chip-sequence generator 39. At the output of the first plurality of product devices 51, 52, 58 is a first plurality of spread-spectrum channels, respectively. The second plurality of product devices 151, 152, 158 multiplies each of the second plurality of sub-data-sequence signals by a respective chip-sequence signal from chip-sequence generator 39. At the output of the second plurality of product devices 151, 152, 158 is a second plurality of spread-spectrum channels, respectively. A particular spread-spectrum channel is identified by the chip-sequence signal that was used to spread-spectrum process the particular sub-data sequence signal. The plurality of chip-sequence signals used to multiply the first plurality of sub-data-sequence signals may be used to multiply the second plurality of sub-data-sequence signals. Alternatively, a first plurality of chip-sequence signals may be used to multiply the first plurality of sub-data-sequence signal, and a second plurality of chip-sequence signals may be used to multiply the second plurality of sub-data-sequence signals, with the first plurality of chip-sequence signals different from the second plurality of chip sequence signals.

The first combiner 45 algebraically combines the first plurality of spread-spectrum channels, and outputs the combined signal as a first multichannel-spread-spectrum signal. Preferably, the first combiner 45 combines the first plurality of spread-spectrum channels linearly, although some nonlinear process may be involved without significant degradation in system performance.

The second combiner 145 algebraically combines the second plurality of spread-spectrum channels, and outputs the combined signal as a second multichannel-spread-spectrum signal. Preferably, the second combiner 145 combines the first plurality of spread-spectrum channels linearly, although some nonlinear process may be involved without significant degradation in system performance.

The first header device 46 concatenates a first header to the first multichannel-spread-spectrum signal. At the output of the first header device 46 is the first packet-spread-spectrum signal. The first header is for chip-sequence synchronization at the receiver.

The second header device 146 concatenates a second header to the second multichannel-spread-spectrum signal. At the output of the second header device 146 is the second packet-spread-spectrum signal. The second linear is for chip-sequence synchronization at the receiver.

The in-phase multiplier device 48 shifts the first packet-spread-spectrum signal to a carrier frequency, as an in-phase component of the carrier frequency. The quadrature-phase multiplier device 148 shifts the second packet-spread-spectrum signal to the carrier frequency, as a quadrature-phase component.

The combiner 52 combines the first packet-spread-spectrum signal, as the in-phase component, and the second packet-spread-spectrum signal, as the quadrature-phase component, to generate a QAM-spread-spectrum signal. The transmitter transmits, at the carrier frequency, the QAM-spread-spectrum signal using radio waves over a communications channel. The transmitter subsystem of the packet transmitter includes appropriate filters, power amplifiers 59 and matching circuits coupled to an antenna 60. The transmitter subsystem also may include a hard limiter, for hard limiting the packet-spread-spectrum signal before transmitting.

Figure 4:
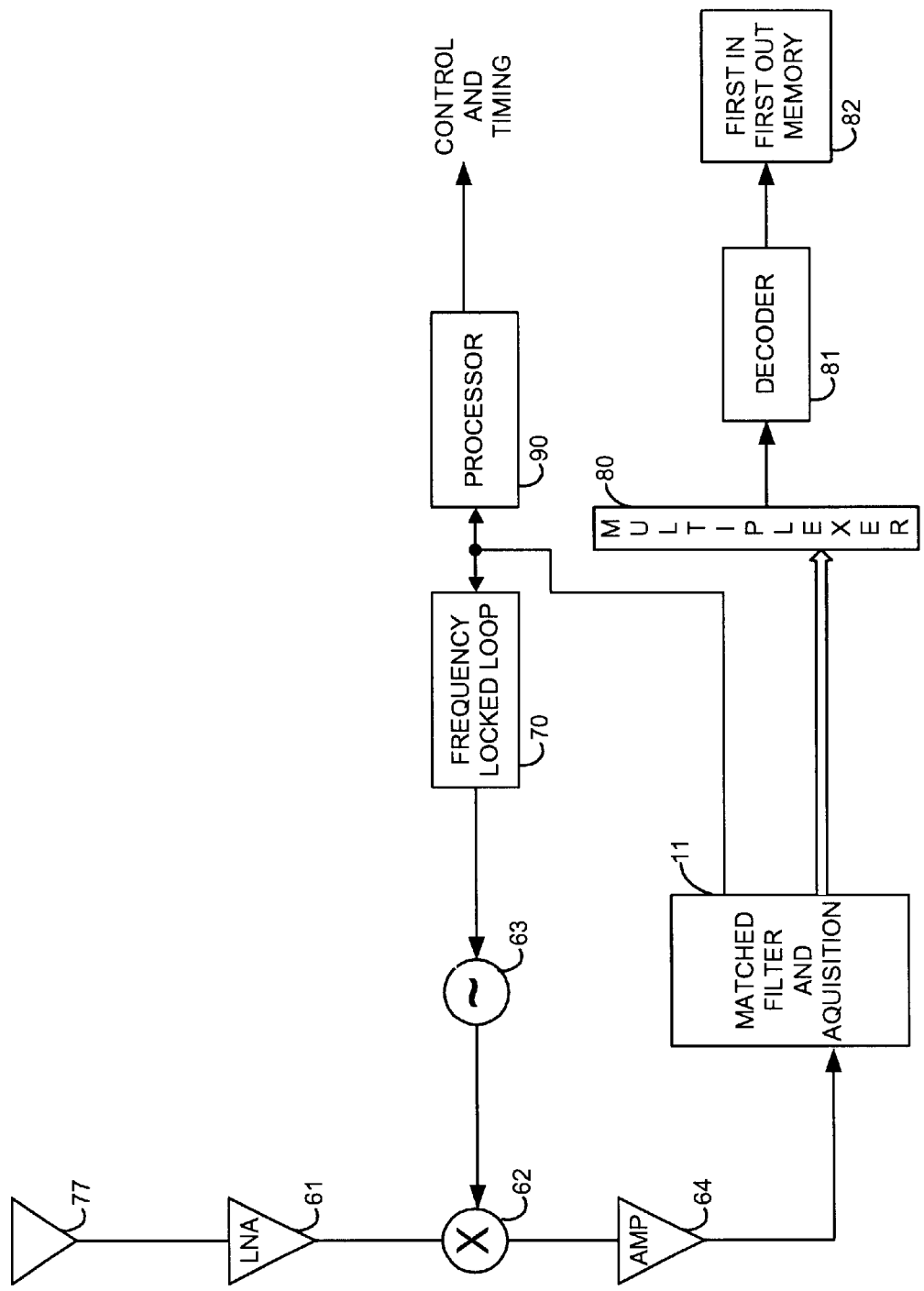
FIG. 4 is a block diagram of a packet receiver.

At the receiver, as shown in FIG. 4, the translating means is shown as a translating device 62 with oscillator 63 and frequency locked loop 70, the header-detection means is embodied as a plurality of header-matched-filter integrators, which are within the matched-filter-and-acquisition circuit 11. The processor means is embodied as a processor 90, the receiver-spread-spectrum means includes a plurality of data-matched filters, which are within the matched-filter-and-acquisition circuit 11, the multiplexing means is embodied as a multiplexer 80 and the decoding means is embodied as a decoder 81. The receiver-memory means is embodied as a receiver-first-in-first-out (receiver-FIFO) memory 82.

The translating device 62 is coupled through an antenna 77 to the communications channel and through an amplifier 64 to the matched-filter-and-acquisition circuit 11. The translating device 62 is coupled to the oscillator 63, and the oscillator 63 is coupled to frequency locked loop 70. The plurality of header-matched-filter integrators within the matched-filter-and-acquisition circuit 11 are coupled to the frequency locked loop 70. The processor 90 is coupled to the header-matched-filter integrators within the matched-filter-and-acquisition circuit 11. The first and second pluralities of data-matched filters within the matched-filter-and-acquisition circuit 11 are coupled between the translating device 62 and the multiplexer 80. The decoder 81 is coupled between the multiplexer 80 and the receiver-FIFO memory 82.

The translating device 62 translates the received QAM-spread-spectrum signal from the carrier frequency to a processing frequency. The translating device 62 may be a mixer, which is well known in the art, for shifting an information signal, which in this disclosure is the received QAM-spread-spectrum signal, modulated at a carrier frequency to IF or baseband. The processing frequency may be RF, IF, at baseband frequency or other desired frequency for a digital signal processor. The signal for shifting the received QAM-spread-spectrum signal is produced by the oscillator 63. The QAM-spread-spectrum signal is processed into an in-phase component and a quadrature-phase component.

Figure 5:
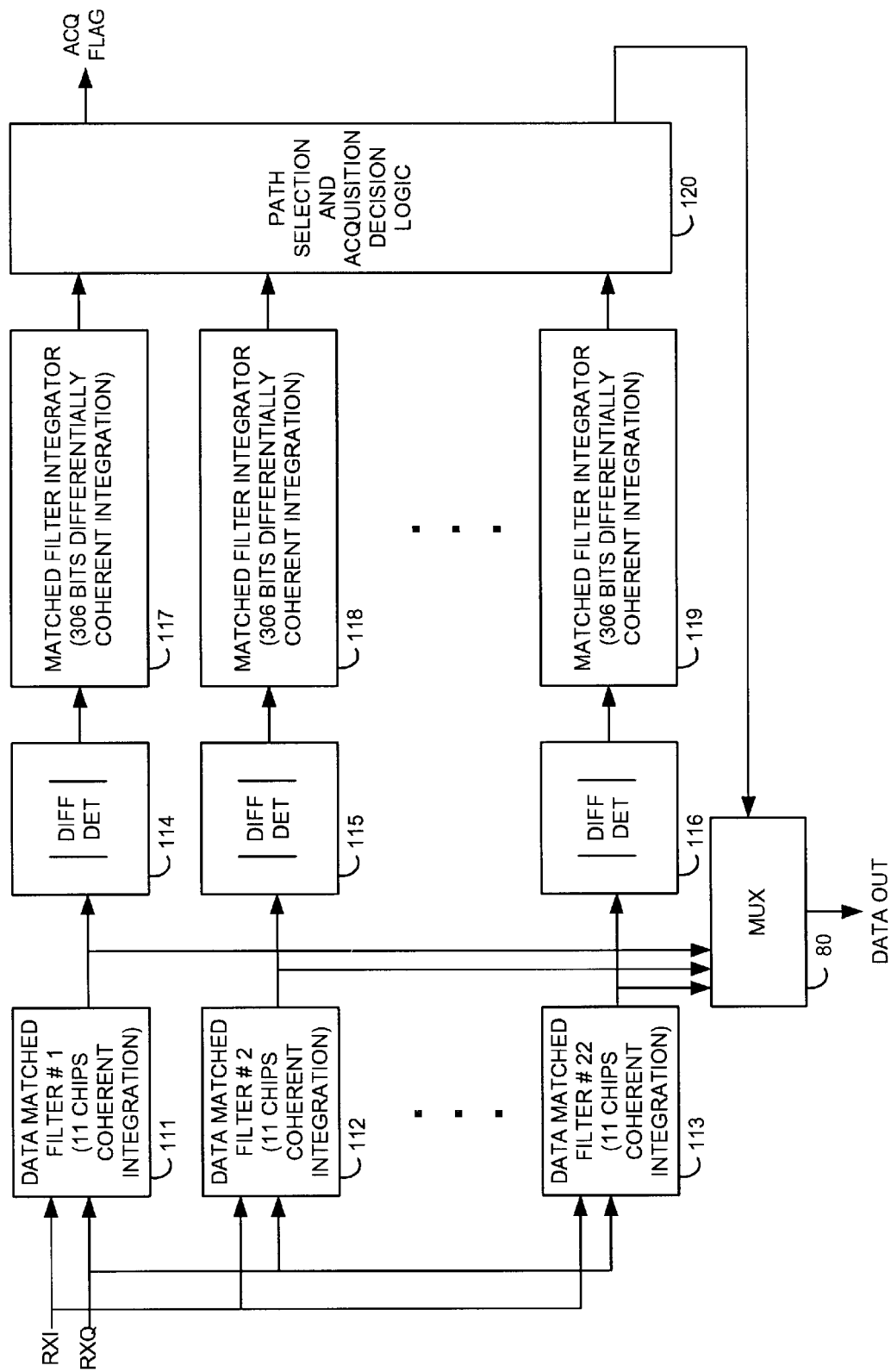
FIG. 5 is a block diagram of a matched filter and acquisition subsystem as used in FIG. 4.

The matched-filter-and-acquisition circuit 11 may include a plurality of data-matched filters 111, 112, 113 and a plurality of header-matched-filter integrators 117, 118, 119, as shown in FIG. 5. The plurality of data-matched filters 111, 112, 113 is coupled through a plurality of absolute-value differential detectors 114, 115, 116 to the plurality of header-matched-filter integrators 117, 118, 119, respectively. The plurality of header-matched-filter integrators 117, 118, 119 is coupled to path-selection-and-acquisition-decision logic 120. The outputs of the path-selection-and-acquisition-decision logic 120 and the plurality of data-matched filters 111, 112, 113 are coupled through a multiplexer 80. The plurality of data-matched filters 111, 112, 113 and the plurality of header-matched-filter integrators 117, 118, 119 include matched-filter integrators for the in-phase and quadrature-phase components of the QAM-spread-spectrum signal.

The plurality of data-matched filters 111, 112, 113 has a plurality of impulse responses, respectively matched to the plurality of chip-sequence signals generated by chip-sequence generator 39. The plurality of data-matched filters 111, 112, 113 may be embodied as a plurality of digital-matched filters, a plurality of SAW devices, software operating in a processor or an ASIC. The plurality of data-matched filters 111, 112, 113 detects, from the in-phase component, the first plurality of spread-spectrum channels embedded in the QAM-spread-spectrum channels embedded in the QAM-spread-spectrum signal. The detected first plurality of spread-spectrum channel is the first plurality of sub-data-sequence signals, respectively. The plurality of data-matched filters 111, 112, 113 detects, from the quadrature-phase component, the second plurality of spread-spectrum channels. The detected second plurality of spread-spectrum channels is the second plurality of sub-data-sequence signals, respectively. The first plurality of spread-spectrum channels are in the in-phase component of the QAM-spread-spectrum signal, and the second plurality of spread-spectrum channels are in the quadrature-phase component of the QAM-spread-spectrum signal, as described previously.

The plurality of absolute-value differential detectors 114, 115, 116 determine the absolute value of the differentially detected, first and second plurality of spread-spectrum channels.

In FIG. 5, the plurality of header-matched-filter integrators 117, 118, 119 integrate and detect, at the processing frequency, the first header, from the in-phase component, and the second header, from the quadratrue-phase component, embedded in the QAM-spread-spectrum signal. The header-matched-filter integrator can integrate and detect the first header and the second header embedded in the QAM-spread-spectrum signal from all users, since the chip-sequence signal and the bit signal for the first header and the second header and data is common to all users.

The term "header-matched-filter integrator," as used herein, is one or more matched-filter integrators for detecting the first header and the second header. The plurality of header-matched-filter integrators 117, 118, 119 may be embodied as a plurality of digital-matched-filter integrators, software operating in a processor, or an ASIC. In response to detecting the first header and the second header, the header-matched-filter integrator outputs a header-detection signal. Only one of the first header or the second header, however, needs to be detected to output the header-detection signal.

The path-selection-and-acquisition-decision logic 120 selects, and acquires lock, to a detected path of the QAM-spread-spectrum signal, from the plurality of header-matched-filter integrators 117, 118, 119, and outputs an acquisition signal. The acquisition signal passes through the multiplexer 80.

After acquisition of a packet, data are detected from the plurality of data-matched filters 111, 112, 113, and are outputted through multiplexer 80.

Figure 6:
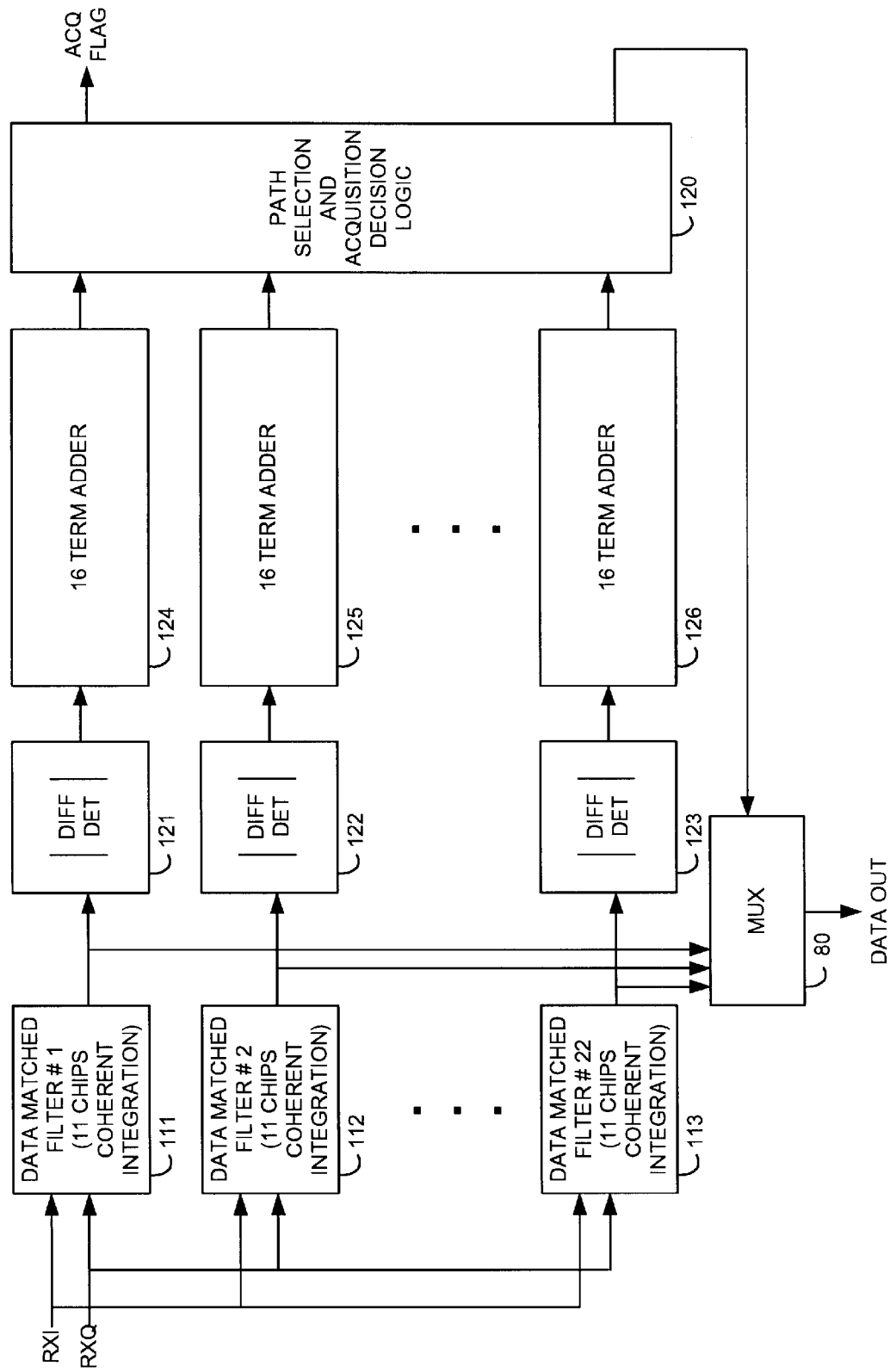
FIG. 6 is a block diagram of an alternative matched filter and acquisition subsystem as used in FIG. 4.

An alternative for the matched-filter-and-acquisition circuit 11 is shown in FIG. 6. The plurality of data-matched filters 111, 112, 113 of FIG. 6 operates the same as those in FIG. 5. The plurality of header-matched-filter integrators 117, 118, 119 of FIG. 5, however, is replaced by a plurality of absolute-value differential detectors 121, 122, 123 connected to a plurality of adders 124, 125, 126, respectively. The plurality of absolute-value differential detectors 121, 122, 123 determine a magnitude of each bit of the first header and the second header, and the plurality of adders 124, 125, 126 effectively add up, or integrate, the magnitude of the bits of the first header and the second header. The path-selection-and-acquisition-decision logic 120 works as described in connection with FIG. 5.

The packet receiver of FIGS. 4 and 5 or 6 may be modified by using the header-matched filter, as disclosed in FIG. 2. Similarly, the packet receiver of FIG. 2 may be modified by using the header-matched filter integrators disclosed in FIG. 5 or the absolute-value differential detectors of FIG. 6.

The frequency locked loop 70 is frequency locked in response to the header-detection signal. The frequency locked loop 70 locks the frequency of the oscillator 63 to the carrier frequency of the received QAM-spread-spectrum signal. Circuits for frequency locked loops, and their operation, are well known in the art.

The processor 90, in response to the header-detection signal, generates control and timing signals. The control and timing signals are used for controlling sequences and timing of the invention.

Each chip-sequence signal in the plurality of chip-sequence signals is different, one from another. The plurality of chip-sequence signals, however, is common to all users. Thus, the plurality of data-matched filters 111, 112, 113 can detect the plurality of chip-sequence signals from any of the users.

The multiplexer 80 multiplexes the first plurality of received spread-spectrum channels and the second plurality of received spread-spectrum signals as the received-encoded data. The received-encoded data, in an error-free environment, is the same as the encoded data that was generated at the packet transmitter. The multiplexer 80 may be embodied as a parallel-to-serial converter.

The decoder 81 decodes the received-encoded data as the received data. The decoding is what distinguishes one user from another, since each user encodes with a different privacy type of encoding. For example, a first user and a second user may encode first data and second data, respectively, using a first key and a second key for the DES. Alternatively, the first user and the second user might encode first data and second data, respectively, using modulo two addition of bits from a linear shift register. In the linear register example, the first user would have a first set of taps or settings for generating a first bit sequence, and the second user would have a second set of taps or settings for generating a second bit sequence. The second bit sequence would therefore be different from the first bit sequence.

If the decoder 81 were set to decode with the first key, then either the first data would appear at the output of decoder 81, or non-decoded data would appear at the output of decoder 81. The presence of non-decoded data would be rejected by the decoder 81. The presence of first data, which would be detected by the presence of a correct data sequence in the header or data portion of the packet, would pass to the receiver-FIFO memory 82. A correct data sequence might be a particular combination of bits, indicating proper decoding. The receiver-FIFO memory 82 stores the received data and has the data present at an output.

The present invention has an internal Costas loop for coherent demodulation, and provides initial phase estimation for fast frequency acquisition. The entire Costas loop, including the frequency conversion stage is digital. The RF local oscillator is free running and does not necessitate any correction from the Costas loop.

The present invention has a matched filter based implementation that permits fast acquisition. The QAM-spread-spectrum signal acquisition subsystem is illustrated below. The salient features are:

1. The acquisition portion of the signal consists of random data spread with the BARKER code of length 11.
2. The input data is sampled at the rate of 2 samples per chip.
3. The plurality of data-matched filters can be viewed logically, as a plurality of data-matched filters each matched to a shift of the length 11 BARKER code. Since the received QAM-spread-spectrum signal is sampled at the rate of twice per chip and there are 11 chips in the code we have 22 possible shifts and therefore 22 matched filters.
4. The plurality of data-matched filters outputs are each sampled every 22 incoming samples.
5. A plurality of absolute-value differential detectors 114, 115, 116 processes the output of each data-matched filters in order to remove the effects of the potential frequency offsets.
6. The magnitudes of N consecutive outputs of each of the plurality of absolute-value differential detectors 114, 115, 116 are then summed, either by the plurality of header-matched-filter integrators 117, 118, 119 of FIG. 5 or the plurality of adders 124, 125, 126 of FIG. 6.
7. The header-matched-filter integrator that corresponds to the largest output of the 22 summations is then selected as the header-matched-filter integrator that is of the same phase as the incoming signal. This ends the spread spectrum signal acquisition process.

The present invention includes an internal delay locked loop (DLL) that tracks the incoming chip clock rate.

The present invention can perform coherent as well as differentially coherent detection of the incoming data. The incoming data are either BPSK or QPSK modulated. If the mode in FIG. 5 were used, then the individual channels are BPSK and QPSK modulated; for transmission they are combined and transmitted as a QAM-spread-spectrum signal. At the receiver the plurality of data-matched filters separates the individual components that are QPSK signals.

The present invention incorporates a fast acting automatic gain control (AGC) circuit that ensures the analog-to-digital converter receives proper level signals. The AGC is adaptive; it can quickly adapt in actual operation to changes in signal levels and modulation formats.

The present invention also comprises a method. The method includes the steps of storing data in a memory and encoding the data from the memory as encoded data. The data are demultiplexed using a demultiplexer, into a first plurality of sub-data sequence signals and a second plurality of sub-data-sequence signals. The method includes generating a plurality of chip-sequence signals, and multiplying each of the first plurality of sub-data-sequence signals by a respective chip-sequence signal, thereby generating a first plurality of spread-spectrum channels. The method includes generating a plurality of chip-sequence signals, and multiplying each of the second plurality of sub-data-sequence signals by a respective chip-sequence signal, thereby generating a second plurality of spread-spectrum channels.

The steps include algebraically combining the first plurality of spread-spectrum channels as a first multichannel-spread-spectrum signal, and concatenating a first header to the first multichannel-spread-spectrum signal to generate a first packet-spread-spectrum signal. The steps include algebraically combining the second plurality of spread-spectrum channels as a second multichannel-spread-spectrum signal, and concatenating a second header to the second multichannel-spread-spectrum signal to generate a second packet-spread-spectrum signal. The steps include transmitting on a carrier frequency the first packet-spread-spectrum signal and the second packet-spread-spectrum signal as a QAM-spread-spectrum signal, over a communications channel using radio waves.

The steps include, at a packet receiver, translating the QAM-spread-spectrum signal from the carrier frequency to a processing frequency, and detecting, at the processing frequency, the first header and second header embedded in the QAM-spread-spectrum signal. The chip-sequence signal used for the first header and the second header and the data is common to all users. In response to detecting the first header and the second header, the method includes outputting a header-detection signal and generating control and timing signals. The steps also include despreading the first multichannel-spread-spectrum signal of the QAM-spread-spectrum signal as a first plurality of received spread-spectrum channels. The steps also include despreading the second multichannel-spread-spectrum signal of the QAM-spread-spectrum signal as a second plurality of received spread-spectrum channels. The first plurality of received spread-spectrum channels and the second plurality of received spread-spectrum signals are multiplexed as received-encoded data. The steps include decoding the received-encoded data as received data, and storing the received data in a memory for output to a data output.

It will be apparent to those skilled in the art that various modifications can be made to the packet-switched spread-spectrum system of the instant invention without departing from the scope or spirit of the invention, and it is intended that the present invention cover modifications and variations of the packet-switched spread-spectrum system provided they come within the scope of the appended claims and their equivalents.

We claim:

1. A packet-switched system for communicating data, comprising:
    a plurality of packet transmitters, each packet transmitter including,
        a transmitter-first-in-first-out (transmitter-FIFO) memory, coupled to a data input, for storing data;
        a demultiplexer, coupled to said transmitter-FIFO memory and having a plurality of outputs, for demultiplexing the stored data into a first plurality of sub-data-sequence signals and a second plurality of sub-data-sequence signals, with a respective sub-data-sequence signal at a respective output a said demultiplexer;
        chip-sequence means for outputting a plurality of chip-sequence signals, with each chip-sequence signal orthogonal to the other chip-sequence signals in said plurality of chip-sequence signals;
        a first plurality of product devices, coupled to the plurality of outputs of said demultiplexer, respectively, and to said chip-sequence means, for multiplying each of the first plurality of sub-data-sequence signals by a chip-sequence signal of the plurality of chip-sequence signals, respectively, thereby generating a first plurality of spread-spectrum channels;
        a second plurality of product devices, coupled to the plurality of outputs of said demultiplexer, respectively, and to said chip-sequence means, for multiplying each of the second plurality of sub-data-sequence signals, by a chip-sequence signal of the plurality of chip-sequence signals, respectively, thereby generating a second plurality of spread-spectrum channels;
        a first combiner, coupled to the first plurality of product devices, for algebraically combining the first plurality of spread-spectrum channels as a first multichannel-spread-spectrum signal;
        a first header device, coupled to said first combiner, for concatenating a header to the first multichannel-spread-spectrum signal, thereby generating a first packet-spread-spectrum signal;
        a second combiner, coupled to the second plurality of product devices, for algebraically combining the second plurality of spread-spectrum channels as a second multichannel-spread-spectrum signal;
        a second header device, coupled to said second combiner, for concatenating a header to the second multichannel-spread-spectrum signal, thereby generating a second packet-spread-spectrum signal;
        a transmitter subsystem, coupled to said first and second header devices, for combining the first and second packet-spread-spectrum signals as a QAM-spread-spectrum signal and for transmitting the QAM-spread-spectrum signal on a carrier frequency using radio waves over a communications channel; and
    a plurality of packet receivers, each packet receiver including,
        a translating device, coupled to the communications channel, for translating the QAM-spread-spectrum signal from the carrier frequency to a processing frequency;
        a header-matched-filter integrator, coupled to said translating device, for processing, at the processing frequency, the header in the QAM-spread-spectrum signal;
        a first plurality of data-matched filters, coupled to said translating device, with each of said first plurality of data-matched filters having an impulse response matched to a chip-sequence signal of the plurality of chip-sequence signals, respectively, for despreading the first multichannel-spread-spectrum signal embedded in the QAM-spreadspectrum signal as a first plurality of received spread-spectrum channels, respectively;

a second plurality of data-matched filters, coupled to said translating device, with each of said second plurality of data-matched filters having an impulse response matched to a chip-sequence signal of the plurality of chip-sequence signals, respectively, for despreading the second multichannel-spread-spectrum signal embedded in the QAM-spread-spectrum signal as a second plurality of received spread-spectrum channels, respectively; and a multiplexer, coupled to said first plurality of data-matched filters and to said second plurality of data-matched filters, for multiplexing the first and second plurality of received spread-spectrum channels as received data.

2. The packet-switched system as set forth in claim 1, with said chip-sequence means including a chip-sequence generator for generating the plurality of chip-sequence signals.

3. The packet-switched system as set forth in claim 1, with said chip-sequence means including a memory for storing the plurality of chip-sequence signals.

4. A packet-switched system for communicating data, comprising:

a plurality of packet transmitters, each packet transmitter including, transmitter-memory means, coupled to a data input, for storing data;

demultiplexer means, coupled to said transmitter-memory means and having a plurality of outputs, for demultiplexing the stored data into a first plurality of sub-data-sequence signals and a second plurality of sub-data-sequence signals, with a respective sub-data-sequence signal at a respective output of said demultiplexer means;

transmitter-spread-spectrum means, coupled to the plurality of outputs of said demultiplexer means, for spread-spectrum processing each of the first plurality of sub-data-sequence signals and each of the second plurality of sub-data-sequence signals by a chip-sequence signal of a plurality of chip-sequence signals, respectively, thereby generating a first plurality of spread-spectrum channels and a second plurality of spread-spectrum channels, with the respective chip-sequence signal different from a each chip-sequence signal in the plurality of chip-sequence signals for spread-spectrum processing the first plurality of sub-data sequence signals, respectively, and with the plurality of chip-sequence signals commonly used by the plurality of packet transmitters;

combiner means, coupled to said transmitter-spread-spectrum means, for algebraically combining the first plurality of spread-spectrum channels as a first multichannel-spread-spectrum signal and for algebraically combining the second plurality of spread-spectrum channels as a second multichannel-spread-spectrum signal;

header means for adding a first header to the first multichannel-spread-spectrum signal, thereby generating a first packet-spread-spectrum signal, and for adding a second header to the second multichannel-spread-spectrum signal, thereby generating a second packet-spread-spectrum signal; and transmitter-subsystem means, coupled to said header means, for combining the first packet-spread-spectrum signal and the second packet-spread-spectrum signal as a quadrature amplitude modulated (QAM) signal, and for transmitting at a carrier frequency the QAM packet-spread-spectrum signal using radio waves over a communications channel; and a plurality of packet receivers, each packet receiver including, header-detection means, coupled to said communications channel, for processing the first header in the first packet-spread-spectrum signal and for detecting the second header in the second packet-spread-spectrum signal;

receiver-spread-spectrum means for despreading the first multichannel-spread-spectrum signal embedded in the first packet-spread-spectrum signal as a first plurality of received spread-spectrum channels, and for despreading the second multichannel-spread-spectrum signal embedded in the second packet-spread-spectrum signal as a second plurality of received spread-spectrum channels; and multiplexing means, coupled to said receiver-spread-spectrum means, for multiplexing the first and second plurality of received spread-spectrum channels as received data.

5. A packet transmitting comprising:

a transmitter-first-in-first out (transmitter-FIFO) memory, coupled to a data input, for storing data;

a demultiplexer, coupled to said transmitter-FIFO memory and having a plurality of outputs, for demultiplexing the stored data into a first plurality of sub-data-sequence signals and a second plurality of sub-data-sequence signals, with a respective sub-data-sequence signal at a respective output of said demultiplexer;

chip-sequence means for outputting a plurality of chip-sequence signals, with each chip-sequence signal orthogonal to the other chip-sequence signals in said plurality of chip-sequence signals;

a first plurality of product devices, coupled to the plurality of outputs of said demultiplexer, respectively, and to said chip-sequence means, for multiplying each of the first plurality of sub-data-sequence signals by a chip-sequence signal of the plurality of chip-sequence signals, respectively, thereby generating a first plurality of spread-spectrum channels;

a second plurality of product devices, coupled to the plurality of outputs of said demultiplexer, respectively, and to said chip-sequence means, for multiplying each of the second plurality of sub-data-sequence signals, by a chip-sequence signal of the plurality of chip-sequence signals, respectively, thereby generating a second plurality of spread-spectrum channels;

a first combiner, coupled to the first plurality of product devices, for algebraically combining the first plurality of spread-spectrum channels as a first multichannel-spread-spectrum signal;

a first header device, coupled to said first combiner, for concatenating a header to the first multichannel-spread-spectrum signal, thereby generating a first packet-spread-spectrum signal;

a second combiner, coupled to the second plurality of product devices, for algebraically combining the second plurality of spread-spectrum channels as a second multichannel-spread-spectrum signal;

a second header device, coupled to said second combiner, for concatenating a header to the second multichannelspread-spectrum signal, thereby generating a second packet-spread-spectrum signal; and a transmitter subsystem, coupled to said first and second header devices, for combining the first and second packet-spread-spectrum signals as a QAM-spread-spectrum signal and for transmitting the QAM-spread-spectrum signal on a carrier frequency using radio waves over a communications channel.

6. A packet receivers comprising:

header-detection means, coupled to a communications channel, for processing a first header in a first packet-spread-spectrum signal and for detecting a second header in a second packet-spread-spectrum signal;

receiver-spread-spectrum means for despreading a first multichannel-spread-spectrum signal embedded in the first packet-spread-spectrum signal as a first plurality of received spread-spectrum channels, and for despreading a second multichannel-spread-spectrum signal embedded in the second packet-spread-spectrum signal as a second plurality of received spread-spectrum channels; and multiplexing means, coupled to said receiver-spread-spectrum means, for multiplexing the first and second plurality of received spread-spectrum channels as received data.

7. The packet-switched system as set forth in claim 4 or 6, further including translating means, coupled between the communications channel and the header-detection means, for translating the packet-spread-spectrum signal from the carrier frequency to a processing frequency.

8. The packet-switched system as set forth in claim 4 or 6, further including processor means, coupled to said header-detection means, for generating control and timing signals.

9. The packet-switched system as set forth in claim 4 or 5 with said transmitter-spread-spectrum means including:

generating means for generating the plurality of chip-sequence signals;

a first plurality of EXCLUSIVE-OR gates coupled between said demultiplexing means, said combiner means and said generating means, for multiplying the first plurality of sub-data-sequence signals by the first plurality of chip-sequence signals, respectively, thereby generating the first plurality of spread-spectrum channels; and a second plurality of EXCLUSIVE-OR gates coupled between said demultiplexing means, said combiner means and said generating means, for multiplying the second plurality of sub-data-sequence signals by the second plurality of chip-sequence signals, respectively, thereby generating the second plurality of spread-spectrum channels.

10. The packet-switched system as set forth in claim 4 or 5 with said transmitter-spread-spectrum means including a memory for storing the plurality of chip-sequence signals.

11. The packet-switched system as set forth in claim 4 or 5 with said transmitter-spread-spectrum means including a first plurality of product devices for multiplying each of the first plurality of sub-data-sequence signals by a respective chip-sequence signal of the plurality of chip sequence signals, and a second plurality of product devices for multiplying each of the second plurality of sub-data-sequence signals by a respective chip-sequence signal of the plurality of chip-sequence signals.

12. The packet-switched system as set forth in claim 4 or 5 with said transmitter-spread-spectrum means including a first plurality of matched filters and a second plurality of matched filters, with each of the first plurality of matched filters and each of the second plurality of matched filters having an impulse response matched to a respective chip-sequence signal of the plurality of chip-sequence signals.

13. The packet-switched system as set forth in claim 4 or 5 with said transmitter-spread-spectrum means including a first plurality of surface-acoustic-wave devices and a second plurality of surface-acoustic-wave devices, with each of the first plurality of surface-acoustic-wave devices and each of the second plurality of surface-acoustic-wave devices having an impulse response matched to a chip-sequence signal of the plurality of chip-sequence signals, respectively.

14. The packet-switched system as set forth in claim 4 or 5 with said receiver-spread-spectrum means including a first plurality of data-matched filters and a second plurality of data-matched filters, which each of the first and second plurality of data-matched filters having an impulse response matched to a chip-sequence signal of the plurality of chip-sequence signals, respectively.

15. The packet-switched system as set forth in claim 4 or 5 with said receiver-spread-spectrum means including a first plurality of surface-acoustic-wave devices and a second plurality of surface-acoustic-wave devices, with each of the first plurality of surface-acoustic-wave devices and each of the second plurality of surface-acoustic-wave devices having an impulse response matched to a chip-sequence signal of the plurality of chip-sequence signals, respectively.

16. The packet-switched system as set forth in claim 4 or 6 with said header-detection means including a first header-matched filter integrator having an impulse response matched to the first header and a second header-matched filter integrator having an impulse response matched to the second header.

17. A packet-switched method for communicating data, comprising the steps of:

storing data;

demultiplexing the stored data into a first plurality of sub-data-sequence signals and a second plurality of sub-data-sequence signals;

spread-spectrum processing each of the first plurality of sub-data-sequence signals, thereby generating a first plurality of spread spectrum channels, and each of the second plurality of sub-data-sequence signals, thereby generating a second plurality of spread-spectrum channels;

combining the first plurality of spread-spectrum channels as a first multichannel-spread-spectrum signal;

concatenating a header to the first multichannel-spread-spectrum signal, thereby generating a first packet-spread-spectrum signal;

combining the second plurality of spread-spectrum channels as a second multichannel-spread-spectrum signal;

concatenating a header to the second multichannel-spread-spectrum signal, thereby generating a second packet-spread-spectrum signal;

combining the first and second packet-spread-spectrum signals as a QAM-spread-spectrum signal;

transmitting the QAM-spread-spectrum signal on a carrier frequency using radio waves over a communications channel;

translating the QAM-spread-spectrum signal from the carrier frequency to a processing frequency;

processing, at the processing frequency, the header in the QAM-spread-spectrum signal;

despreading the first multichannel-spread-spectrum signal embedded in the QAM-spread-spectrum signal as a first plurality of received spread-spectrum channels, respectively; and despreading the second multichannel-spread-spectrum signal embedded in the QAM-spread-spectrum signal as a second plurality of received spread-spectrum channels; and multiplexing the first and second plurality of receiver spread-spectrum channels as received data.

18. A method, using a transmitter, comprising the steps of:

storing data;

demultiplexing the stored data into a first plurality of sub-data-sequence signals and a second plurality of sub-data-sequence signals;

spread-spectrum processing each of the first plurality of sub-data sequence signals, thereby generating a first plurality of spread-spectrum channels, and each of the second plurality of sub-data-sequence signals, thereby generating a second plurality of spread-spectrum channels;

combining the first plurality of spread-spectrum channels as a first multichannel-spread-spectrum signal;

concatenating a header to the first multichannel-spread-spectrum signal, thereby generating a first packet-spread-spectrum signal;

combining the second plurality of spread-spectrum channels as a second multichannel-spread-spectrum signal;

concatenating a header to the second multichannel-spread-spectrum signal, thereby generating a second packet-spread-spectrum signal;

combining the first and second packet-spread-spectrum signals as a QAM-spread-spectrum signal; and transmitting the QAM-spread-spectrum signal on a carrier frequency using radio waves over a communications channel.

19. A method, using a receiver, comprising the steps of:

translating a QAM-spread-spectrum signal from a carrier frequency to a processing frequency;

processing, at the processing frequency, a header in the QAM-spread-spectrum signal;

despreading a first multichannel-spread-spectrum signal embedded in the QAM-spread-spectrum signal as a first plurality of received spread-spectrum channels; and despreading a second multichannel-spread-spectrum signal embedded in the QAM-spread-spectrum signal as a second plurality of received spread-spectrum channels, and multiplexing the first and second plurality of receiver spread-spectrum channels as received data.

* * * * *